United States Patent [19]

Granetzke

[11] Patent Number: 4,763,723
[45] Date of Patent: Aug. 16, 1988

[54] MOUNTING BRACKET CONSTRUCTION FOR VEHICULAR RADIATORS

[75] Inventor: Dennis C. Granetzke, Racine, Wis.

[73] Assignee: Modine Manufacturing Company, Racine, Wis.

[21] Appl. No.: 35,768

[22] Filed: Apr. 8, 1987

[51] Int. Cl.⁴ .......................... F28F 9/00; F28D 1/00
[52] U.S. Cl. ..................... 165/67; 165/149; 180/68.4
[58] Field of Search .......... 165/67, 149, 906; 180/68.4

[56] References Cited

U.S. PATENT DOCUMENTS

| | | | |
|---|---|---|---|
| 1,906,969 | 5/1933 | Inde | 165/149 X |
| 2,505,790 | 5/1950 | Panthofer | 165/69 |
| 2,506,051 | 5/1950 | Young | 165/67 |
| 4,137,982 | 2/1979 | Crews et al. | 165/149 |
| 4,367,793 | 1/1983 | MacIntosh | 165/151 |
| 4,519,467 | 5/1985 | Saunders | 165/67 X |
| 4,540,044 | 9/1985 | Lenz | 165/67 X |
| 4,651,816 | 3/1987 | Struss et al. | 165/76 |

Primary Examiner—Ira S. Lazarus
Assistant Examiner—Peggy A. Neils
Attorney, Agent, or Firm—Wood, Dalton, Phillips, Mason & Rowe

[57] ABSTRACT

A radiator and shroud assembly including a generally planar radiator core 10 having a plurality of generally parallel tubes 12 interconnected by fins 14 with opposed ends defined by tanks 16 and joined by spaced sides 18 which are generally parallel to the tubes 12. Each of the sides 18 has at least one fastener receiving aperture 26 and mounting brackets 30, 32 abuts the side pieces 18 and have a truss-like configuration which is made fluid impervious by thin web 84. Fasteners 42 extend through core apertures 26 and aligned apertures 40 in the brackets 30, 32 to secure the brackets 30, 32 in essentially nominally sealed relation to the core 10. A fan shroud 50 is similarly mounted to the brackets 30, 32.

10 Claims, 2 Drawing Sheets

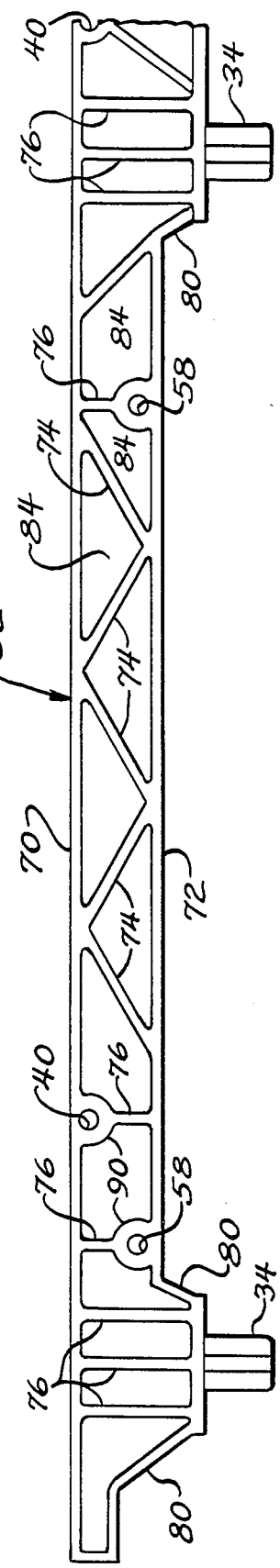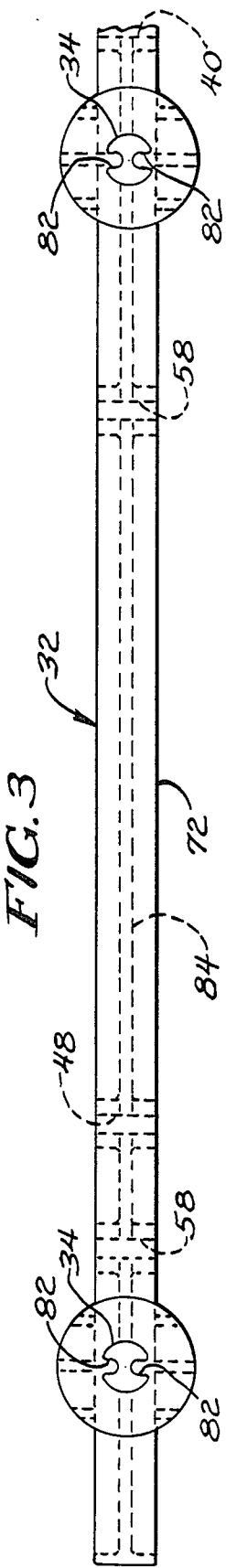

MOUNTING BRACKET CONSTRUCTION FOR VEHICULAR RADIATORS

FIELD OF THE INVENTION

This invention relates to heat exchangers such as vehicular radiators, and more particularly, to a mounting bracket that may be utilized in mounting such a heat exchanger and/or a fan shroud in a vehicle.

BACKGROUND OF THE INVENTION

One heat exchange fluid employed with vehicular heat exchangers such as radiators is the air in which the vehicle is moving. The air is commonly ducted through a grill or the like andn passed through the heat exchanger or radiator with the assistance of a fan driven either by the engine or by a small electric motor.

The determination to increase vehicle fuel economy has led to constraints on vehicle size which in turn has led to constraints on the amount of grill area available on a vehicle that may be occupied by the radiator. Furthermore, it is desirable to minimize aerodynamic drag on the vehicle for the same reason and that in turn means that the heat exchange fluid in the form of air must be efficiently used, i.e., that a large percentage of the air entering the vehicle structure through the grill be in fact used for heat exchange by being passed through the heat exchanger or radiator.

In addition, and again to achieve better fuel economy, it is desirable to reduce vehicle weight.

Structure by which certain of the foregoing objects can be achieved is disclosed in the commonly assigned application of Struss et al, Ser. No. 841,208, filed Mar. 19, 1986 and entitled "Heat Exchanger Module for a Vehicle or the Like", now U.S. Pat. No. 4,651,816. Struss et al disclose a plastic bar having a series of recesses along its length and which may be used for mounting heat exchangers to each other or to a vehicle. Each recess has a closed bottom of sufficient thickness to prevent the flow of the heat exchange fluid, namely air, through the recess and of sufficient thinness so as to be easily penetrable by fasteners which may be employed to join the heat exchangers together or the heat exchangers to a vehicular frame.

The present invention constitutes an improvement on the construction disclosed in the Struss et al application.

SUMMARY OF THE INVENTION

It is the principal object of the invention to provide a new and improved mounting bracket for use in mounting heat exchangers such as vehicular radiators in vehicles. It is also an object of the invention to provide such a mounting bracket that may be utilized in forming a radiator and shroud assembly.

An exemplary embodiment of the invention achieves the foregoing objects in a radiator assembly including a generally planar radiator core having a plurality of generally parallel tubes interconnected by fins. The core has opposed ends joined by spaced sides which are generally parallel to the tubes. A tank is located on each of the ends and a side piece is disposed on each of the sides. Each side piece has at least one fastener receiving aperture opening in a direction transverse to the core.

A mounting bracket is provided to abut each side piece along the length thereof. Each such mounting bracket is an integral plastic piece with a truss-like configuration defined by spaced, parallel chords interconnected by a plurality of spaced diagonal braces and at least one transverse brace. The space between the chords and the braces is closed by an integral, thin web and there is provided at least one first aperture aligned with the aperture in the adjacent side piece along with mounting means integral with and and extending from one of the chords.

As a consequence of this construction, a light weight mounting bracket is provided to thereby provide a reduction in vehicle weight. The use of a truss-like configuration assures that the bracket has adequate strength for its intended purpose while the use of the thin web to close the spaces between the chords and the braces prevents flow of the heat exchange fluid through such spaces and thus will typically require that the heat exchange fluid pass through the radiator core rather than bypass the same to assure efficient use of the heat transfer fluid.

In a highly preferred embodiment, one of the chords of each of the brackets is in abutment with the corresponding side piece and the mounting means includes posts extending away from the chord and integral with the other chord of the associated bracket.

A highly preferred embodiment contemplates that the posts be generally coplanar with the core and extend away from the side pieces. The posts further include at least one longitudinal groove whereby the circumference of each post may be lessened by squeezing the same across the groove to facilitate receipt of the post in a vehicular frame.

The invention further contemplates the provision of a fan shroud having a generally planar peripheral edge complementary in size and shape to the size and shape of the core with the brackets secured thereto. A plurality of fastener receiving apertures are located at spaced locations in the edge, there being one such aperture for each such bracket. Each bracket further contains second apertures which are aligned with corresponding ones of the apertures in the edge and fasteners are disposed in aligned ones of the edge apertures in the second apertures to secure the shroud to the bracket and bring the peripheral edge of the shroud into at least a nominal sealed relationship with the brackets, the core or the tanks.

Preferably, the apertures in the brackets are located in relatively thick bosses formed in the brackets to achieve good strength.

Other objects and advantages will become apparent from the following specification taken in connection with the accompanying drawings.

DESCRIPTION OF THE DRAWINGS

FIG. 2 is a side elevation of one form of a bracket that may be utilized in the invention; and FIG. 3 is a bottom view of the bracket shown in FIG. 2.

DESCRIPTION OF THE PREFERRED EMBODIMENT

Figure 1:
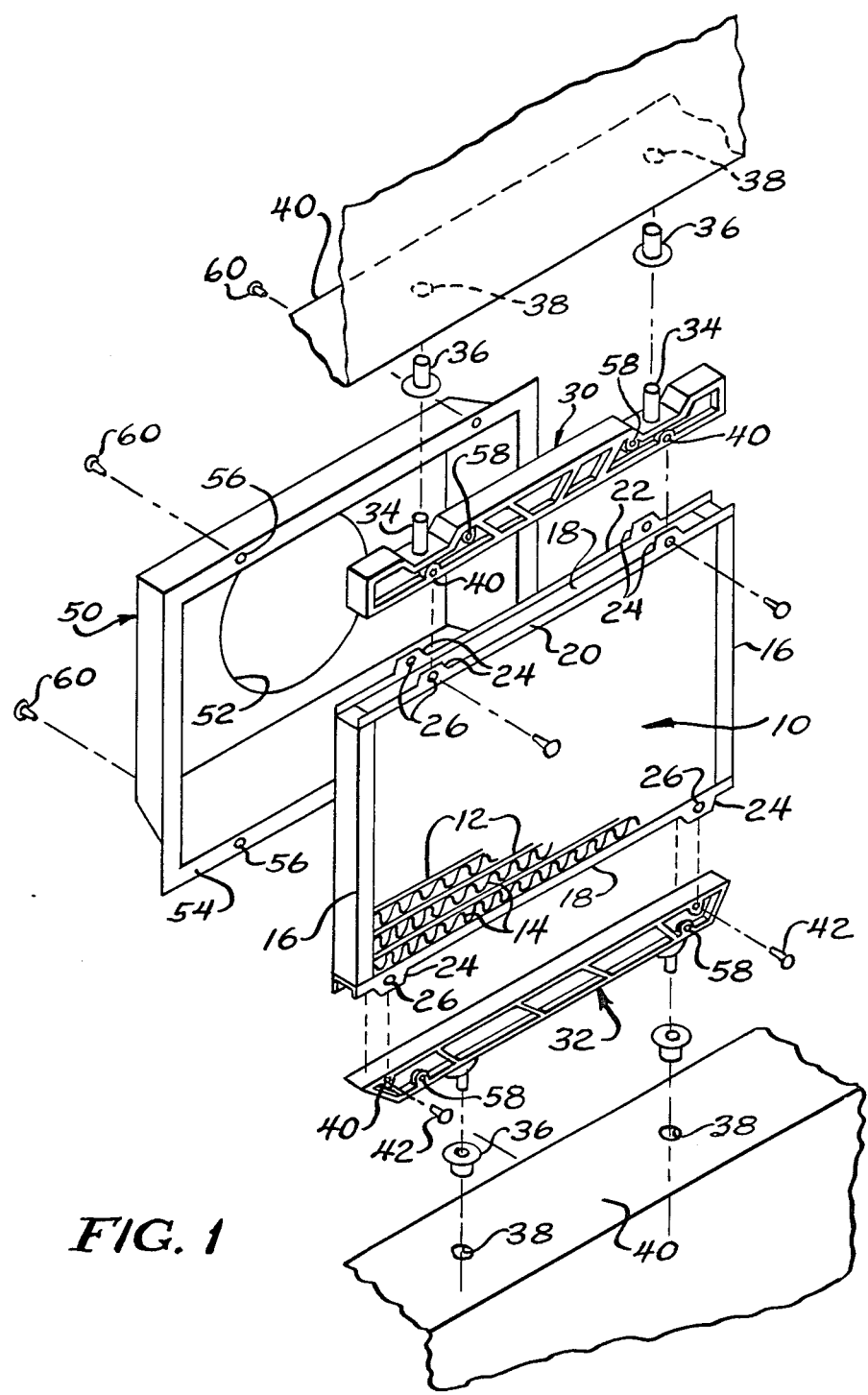
FIG. 1 is an exploded view of the radiator and shroud assembly made according to the invention in the environment of a vehicle frame.

An exemplary embodiment of a mounting bracket made according to the invention and a radiator and/or shroud assembly employing the same is illustrated in FIG. 1 of the drawings. With reference thereto, there is illustrated a radiator core, generally designated 10, of conventional construction. The core 10 includes a plurality of parallel tubes 12 extending to headers (not shown) and interconnected by serpentine fins 14. Of course, plate fins could be utilized in lieu of the serpentine fins 14.

Tanks 16 and the ends of the core 10 are attached to the header plates (or may be made integral therewith) and are provided with inlet and outlet fixtures (not shown). The tanks 16 are interconnected by opppositely and outwardly opening channels 18 which serve as side plates for the resulting heat exchanger. Each side plate 18 is parallel to the tubes 12 and includes two upstanding walls 20 and 22. Each wall 20 and 22 has a pair of extensions in the form of tabs 24. Each tab 24 includes an aperture 26 which opens in a direction generally transverse to a plane defined by the core 10.

In the embodiment illustrated in FIG. 1, the tanks 16 are virtually elongated on the core 10. However, it will be appreciated that in some instances, the assembly may be essentially rotated 90° so that the tanks 16 are upper and lower with respect to each other.

In any event, each of the side pieces 18 receives a truss-like mounting bracket, the upper mounting bracket being generally designated 30 and the lower mounting bracket being generally designated 32. The two may be identical or different depending largely upon the construction of the frame of the vehicle in which the heat exchanger is to be located in the immediate vicinity of the mounting bracket 30 and 32. As can be seen, each mounting bracket is elongated and may be disposed in abutment with the corresponding one of the side pieces 18 between the walls 20 and 22 thereof. Each mounting bracket 30 and 32 is provided with outwardly directed posts 34 which may be received in the rubber grommets 36 which in turn are located within bores 38 in vehicle frame members 40.

Each mounting bracket 30 and 32 further include a first set of apertures 40 alignable with the apertures 26 in the side plate 18 against which they are abutted. Fasteners, such as threaded fasteners 42 are introduced through the aligned apertures 26 and 40 thereby secure the brackets 30 and 32 into at least nominally sealed engagement with the corresponding side plate 18 along the entire length thereof.

The assembly may also include a fan shroud, generally designated 50, having a central opening 52 in which the blade of a fan (not shown) may be disposed. The fan shroud 50 includes a generally planar, peripheral edge 54 which is of a size and shape complementary to the size and shape of the core 10 with mounting brackets 30 and 32 and tanks 16 attached thereto. The peripheral edge 54 includes a series of spaced fastener receiving apertures 56 which align with apertures 58 in the brackets 30 and 32. A second set of threaded fasteners 60 may extend through the apertures 56 and the apertures 58 to secure the shroud 50 to one side of the radiator and bracket assembly in such a way that the peripheral edge 54 is nominally sealed against the same.

Turning now to FIGS. 2 and 3, a typical construction of one of the brackets 30 and 32 will be described. More particularly, the construction of the bracket 32 will be described but it shall be appreciated that the principles involved in the construction shown in FIGS. 2 and 3 are applicable in forming the bracket 30 or other like and similar brackets.

In any event, in keeping with the truss-like configuration of the brackets, the same include relatively thick upper and lower, parallel chords 70 and 72. The chords 70 and 72 are interconnected by a plurality of diagonal braces 74 which act to parcel off the space between the chords 70 and 72 into a series of triangles to provide great strength as is well known.

At least one, and generally at least two transverse braces 76 also extend between the chords 70, 72 generally at right angles to both.

Various other braces, shown generally at 80, may be employed where desired to provide the requisite strength. In the usual case, the chords 70 will be planar to abut the base of the channel defining the side plate 18. Conversely, the chord 72 may take on any desired shape but generally will be configured so as to snugly abut, along its length, the vehicular frame so as to avoid any appreciable gaps between the bracket 32 and the frame through which heat exchange fluid, typically air, could pass.

Extending away from the chord 72 are a pair of the posts 34 which, it will be recalled, are intended for receipt in rubber grommets 36 for mounting purposes. As best seen in FIG. 3, each of the posts 34 is generally of cylindrical section but include a pair of opposed, relatively deep, longitudinally extending grooves 82. The presence of the grooves 82 allows each post 34 to be squeezed against its inherent resilience to narrow the groove 82. This effectively reduces the circumference of the post so that when the grommets 36 are used, an easily obtained resilient interference fit of the post 34 within the openings 38 results. This interference fit assures retention of the brackets 30 and 32 against the associated frame members 40 while at the same time, the presence of the grommets 36 allow some relative movement between frame members to occur without overly stressing the mounting brackets 30 and 32.

An important feature of the invention is the provision of a relatively thin web 84 which is located centrally, as seen in FIG. 3, in all of the spaces between the chords 70 and 72 and braces 74, 76 and 80. The web 84 thus renders each mounting bracket 30 and 32 impervious to the flow of heat exchange fluid and together with the frame members 40 will cause heat exchange fluid entering the grill of the vehicle to pass through the core 10. In a preferred embodiment, the thickness of the web will be on the order of 20-25% of the thickness of the chords 70 and 72 and the braces 74, 76 and 80, which are all nominally of the same thickness.

FIGS. 2 and 3 also illustrate a preferred method of forming the apertures 40 and 58. In particular, at any desired location, the mounting brackets 30 and 32 are provided with bosses 90 having the same thickness as the chords 70 and 72. In the illustrated environment, the bosses 90 appear as continuations of the transverse braces 76 but they need not be so formed. It is simply desirable that they be directly connected to one of the braces 74, 76 80 or to one of the chords 70 and 72 and not be totally surrounded by part of the web 84. The apertures 40 and 58 are then located centrally within the bosses as illustrated.

Generally, the diameter of the apertures 40 and 58 will be somewhat smaller than the outermost diameter of the fasteners 42 and 60 so that the latter are frictionally held within the bores 58 after the assembly is completed.

From the foregoing, it will be seen that a radiator assembly made according to the invention produces a number of advantages. The same is made as an integral plastic piece and thus reduces vehicle weight to produce a fuel economy. Furthermore, by reason of the truss-like configuration, the amount of material to make a strong, durable mounting bracket is reduced over that required by the previously identified construction of Struss et al. Thus, the cost is reduced without sacrificing strength.

The use of the web 84 and the concept of shaping the chord 72 to the configuration of the vehicle frame 40 which it abuts eliminates short circuiting paths for the heat exchange fluid which is to say that it essentially requires all heat exchange fluid impinging upon the front of the core to pass through the core thereby making efficient use of the heat exchange fluid entering the vehicle.

I claim:

1. A radiator and shroud assembly comprising:
a generally planar radiator core having a plurality of generally parallel tubes interconnected by fins, said core having opposed ends joined by spaced sides which are generally parallel to said tubes;
a tank on each of said ends;
a side piece on each of said sides, each having at least one fastener receiving aperture opening transverse to said core;
a mounting bracket abutting each side piece along the length thereof and having at least one first aperture aligned with the aperture(s) in the adjacent side piece, each said bracket having a truss-like configuration but being made fluid impervious in a direction transverse to said core by a thin web, each said bracket further including at least one mounting post for receipt in a vehicle frame to mount the assembly in such frame;
fasteners extending through said core apertures and the aligned first apertures to secure said brackets to said core;
a fan shroud having a generally planar peripheral edge complementary in size and shape so that of said core with said brackets secured thereto;
a plurality of fastener receiving apertures at spaced locations in said edge, at least one for each said bracket;
at least one second aperture in each said bracket and aligned with a corresponding one of said edge apertures; and
fasteners in aligned ones of said edge aperture and said second aperture securing said shroud to said brackets and bringing said edge into a nominal sealed relation with said bracket, said core, or said tanks.

2. The radiator and shroud assembly of claim 1 wherein said brackets are formed of plastic and said web and said posts are integral parts thereof.

3. The radiator and shroud assembly of claim 2 wherein said posts are generally coplanar with said core and extend away from said side pieces, said posts further including at least one longitudinal groove whereby the circumference of each post may be lessened by squeezing the same across the groove to facilitate receipt of the post in a vehicular frame.

4. The radiator and shroud assembly of claim 1 wherein each said bracket is an elongated integral plastic element with said truss-like configuration being relatively thick and said web constituting a relatively thin section spanning said truss-like configuration, said first and second apertures being disposed in bosses (a) forming part of said truss-like configuration, (b) joined directly to said truss-like configuration, and (c) having generally the same thickness as said truss-like configuration.

5. A radiator and shroud assembly comprising:
a generally planar radiator core having a plurality of generally parallel tubes interconnected by fins, said core having opposed ends joined by spaced sides which are generally parallel to said tubes;
a tank on each of said ends;
a side piece on each of said sides, each having at least one fastener receiving aperture opening transverse to said core;
a mounting bracket abutting each side piece along the length thereof, each said mounting bracket being an integral plastic piece with a truss-like configuration defined by spaced, parallel chords interconnected by a plurality of spaced diagonal braces and at least one transverse brace, the spaces between said chords and said braces being closed by an integral, thin web, each said mounting bracket having at least one first aperture aligned with the aperture in the adjacent side piece and mounting means integral with and extending from one of said chords;
fasteners extending through said core apertures and the aligned first apertures to secure said brackets to said core;
a fan shroud having a generally planar peripheral edge complementary in size and shape to that of said core with said brackets secured thereto;
a plurality of fastener receiving apertures at spaced location in said edge, at least one for each said bracket;
at least one second aperture in each said bracket and aligned with a corresponding one of said edge apertures; and
fasteners in aligned ones of said edge apertures and said second apertures securing said shroud to said and bringing said edge into a nominal sealed relation with said bracket, said core, or said tanks.

6. The radiator and shroud assembly of claim 5 wherein one of the chords of each of said brackets is in abutment with the corresponding side piece and said mounting means include posts extending away from said core and integral with the other chord of the associated bracket.

7. A radiator and shroud assembly comprising:
a generally planar radiator core having a plurality of generally parallel tubes interconnected by fins, said core having opposed ends joined by spaced sides which are generally parallel to said tubes;
a tank on each of said ends;
a side piece on each of said sides, each having at least one fastener receiving aperture opening transverse to said core;
a truss-like mounting bracket abutting each side piece along the length thereof and having at least one relatively thick boss containing at least one first aperture aligned with the aperture(s) in the adjacent side piece, each said bracket being made fluid impervious in a direction transverse to said core by a thin web;
fasteners extending through said core apertures and the aligned first apertures to secure said brackets to said core;
a fan shroud having a generally planar peripheral edge complementary in size and shape to that of said core with said brackets secured thereto;
a plurality of fastener receiving apertures at spaced locations in said edge, at last one for each said bracket;

at least one second aperture in each said bracket and aligned with a corresponding one of said edge apertures; and fasteners in aligned ones of said edge aperture and said second aperture securing said shroud to said and bringing said edge into a nominal sealed relation with said brackets, said core, or said tanks.

8. A radiator assembly comprising:

a generally planar radiator core having a plurality of generally parallel tubes interconnected by fins, said core having opposed ends joined by spaced sides which are generally parallel to said tubes;

a tank on each of said ends;

a side piece on each of said sides, each having at least one fastener receiving aperture opening transverse to said core;

a mounting bracket abutting each side piece along the length thereof, each said mounting bracket being an integral plastic piece with a truss-like configuration defined by spaced, parallel chords interconnected by a plurality of spaced diagonal braces and at least one transverse brace, the spaces between said chords and said braces being closed by an integral, thin web;

at least one first aperture aligned with the aperture in the adjacent side piece and mounting means integral with and extending from one of said chords; and fasteners extending through said core aperture and the aligned first apertures to secure said brackets to said core.

9. The radiator assembly of claim 8 wherein one of the chords of each of said brackets is in abutment with the corresponding side piece and said mounting means include posts extending away from said core and integral with the other chord of the associated bracket.

10. The radiator assembly of claim 9 wherein said posts are generally coplanar with said core and extend away from said side pieces, said posts further including at least one longitudinal groove whereby the circumference of each post may be lessened by squeezing the same across the groove to facilitate receipt of the post in a vehicular frame.

* * * * *